United States Patent
Takashimizu et al.

(10) Patent No.: US 8,571,392 B2
(45) Date of Patent: Oct. 29, 2013

(54) APPARATUS FOR VIDEO RECORDING AND REPRODUCING, AND METHOD FOR TRICK PLAY OF VIDEO

(75) Inventors: Satoru Takashimizu, Yokosuka (JP); Mitsunobu Watanabe, Yokohama (JP); Satoshi Iimuro, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1436 days.

(21) Appl. No.: 11/958,686

(22) Filed: Dec. 18, 2007

(65) Prior Publication Data

US 2008/0145021 A1    Jun. 19, 2008

(30) Foreign Application Priority Data

Dec. 18, 2006    (JP) .................................. 2006-339985

(51) Int. Cl.
*H04N 5/783*    (2006.01)
(52) U.S. Cl.
USPC ............................. 386/343; 386/346; 386/348
(58) Field of Classification Search
USPC .......................................... 386/346, 343, 348
See application file for complete search history.

(56) References Cited

U.S. PATENT DOCUMENTS

| | | | |
|---|---|---|---|
| 6,580,869 B1 | 6/2003 | Ando et al. | |
| 6,978,082 B1 | 12/2005 | Amano | |
| 7,340,150 B2 * | 3/2008 | Mishima et al. | 386/248 |
| 2002/0018643 A1 | 2/2002 | Okada et al. | |
| 2005/0047501 A1 | 3/2005 | Yoshida et al. | |
| 2005/0094974 A1 | 5/2005 | Nagasawa | |
| 2007/0133942 A1 * | 6/2007 | Moors et al. | 386/68 |
| 2007/0292108 A1 * | 12/2007 | Reichert et al. | 386/68 |

FOREIGN PATENT DOCUMENTS

| | | |
|---|---|---|
| JP | 10-261075 | 9/1998 |
| JP | 2001-36860 | 2/2001 |
| JP | 2005-064569 | 3/2005 |
| JP | 2005-197839 | 7/2005 |
| WO | WO 2006/114761 | 11/2006 |

* cited by examiner

*Primary Examiner* — Kambiz Zand
*Assistant Examiner* — Benjamin Kaplan
(74) *Attorney, Agent, or Firm* — Antonelli, Terry, Stout & Kraus, LLP.

(57) ABSTRACT

In a video recording apparatus which records and reproduces digital TV broadcasting, an I-picture extraction processor that extracts packets containing I-pictures by analyzing a transport stream is arranged. Then, packets containing I-pictures is output, by reading predetermined amount of recorded data from an HDD in which recorded data is stored and by detecting start information and end information of the I-pictures. A stream for special reproduction is output by repeating the above-stated processes. With such arrangement, it is possible, even if data does not contain position information of I-picture, to execute special reproduction such as fast-forwarding reproduction for TV program data that is recorded as an MPEG-formatted transport stream.

6 Claims, 5 Drawing Sheets

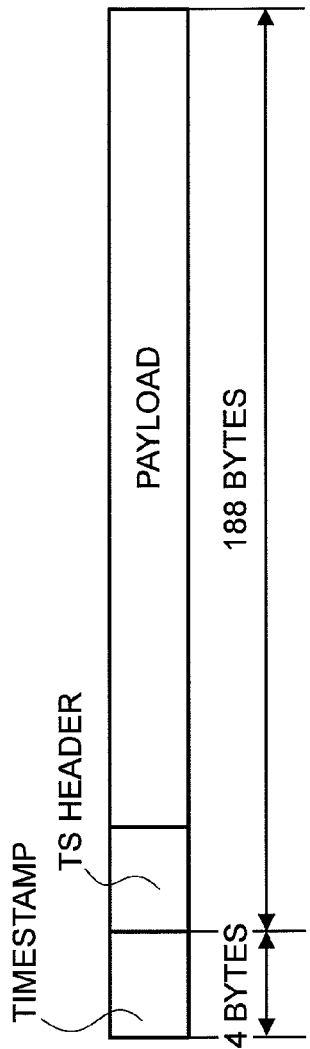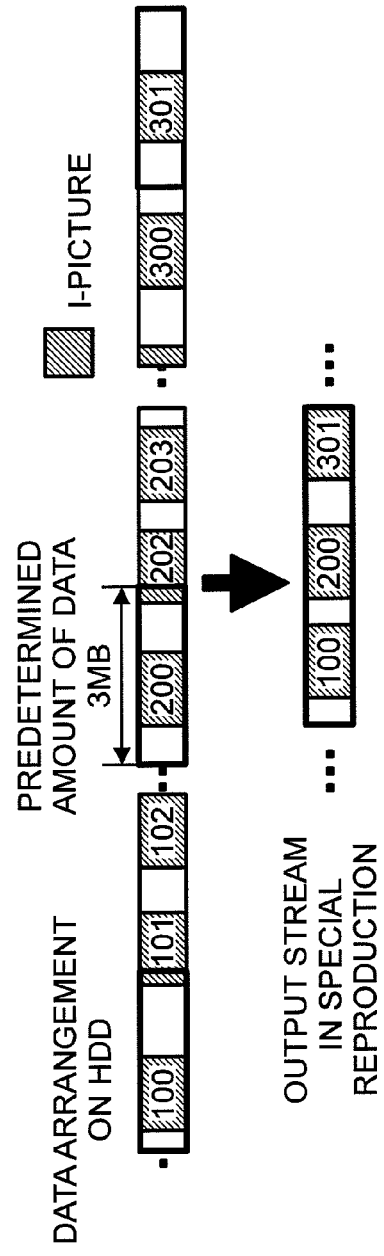

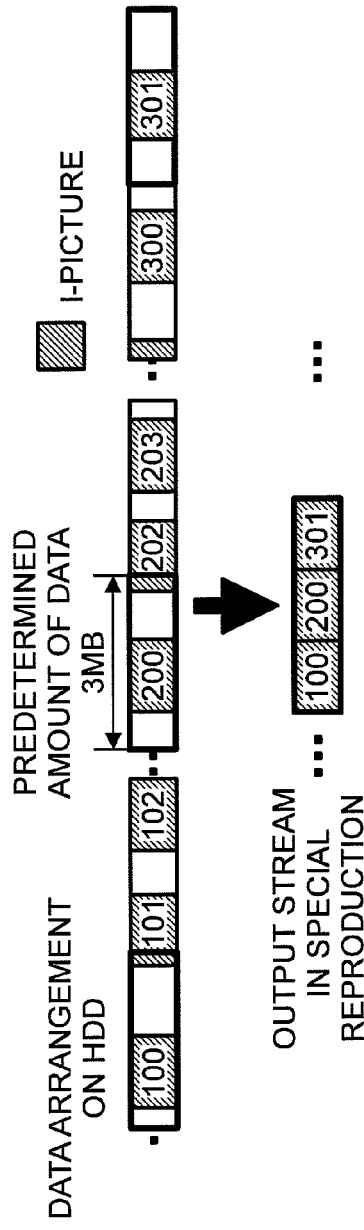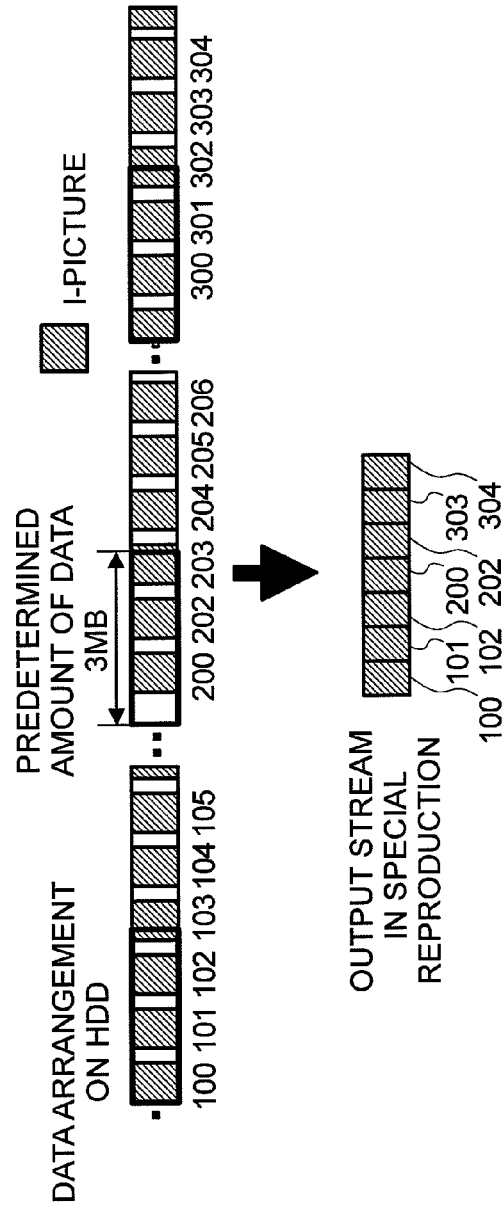

APPARATUS FOR VIDEO RECORDING AND REPRODUCING, AND METHOD FOR TRICK PLAY OF VIDEO

CLAIMS OF PRIORITY

The present application claims priority from Japanese application serial no. JP2006-339985, filed on Dec. 18, 2006, the content of which is hereby incorporated by reference into this application.

BACKGROUND OF THE INVENTION

The present invention relates to a video recording and reproducing apparatus, and a method of reproducing the video, and more specifically to a video recording and reproducing apparatus which is suitably used for recording and reproduction of an MPEG transport stream, and a method of reproducing the video in the apparatus.

In recent years, conventional analogue broadcasting is being shifted to digital broadcasting in the field of television broadcasting service.

The digital broadcasting utilizes picture compression technologies that picture data is transmitted after being compressed, and, as a de fact standard of the picture compression technologies related to digital broadcasting, an MPEG 2 system has been widely prevalent.

With the digital television broadcasting using the MPEG standard, picture data and voice data (AV data) are encoded for processing. The AV data thus encoded is then transmitted to TV sets from a broadcasting station in the form of a transport stream which is time-division multiplexed in comparatively short transmission units (packets).

The transport stream received by a TV set is decoded by a decoder and is then output to a display screen/voice output apparatus as AV data.

The transport stream thus received is temporarily recorded on a recording apparatus such as an HDD (hard disk drive), which also allows reproduction and viewing as required by a viewer. At this time, a user can use special reproduction functions during reproduction, such as fast-forwarding reproduction, rewinding reproduction and jumping reproduction.

Meanwhile, with the MPEG standard, when encoding a picture, it is possible not only to directly encode picture data of all frames, but also to refer to data of neighboring frames that are already encoded and encode only difference from the data. In general, since, in the case of a motion picture, neighboring frames correlate highly each other, it is expected that amount of information after encoding can be significantly reduced by encoding only difference from the neighboring frames.

According to the MPEG standard, pictures are classified into three picture types: an Intra (I) picture, a Predictive (P) picture, and a Bidirectionally predictive (B) picture.

The I-picture is a frame that executes encoding by maintaining independence among Group of Pictures (GOP) without referencing to data of other pictures. On the other hand, the P-picture is a picture that executes encoding by referring to past I-pictures or P-pictures, and the B-picture is a picture that executes encoding by referring to past and future I-pictures or P-pictures. As a result, encoding efficiency becomes higher in the order of I, P and B, which means the I-picture has the lowest encoding efficiency. However, the I-picture has an advantage that pictures can be independently decoded.

Therefore, for conducting special reproduction such as fast forwarding, a picture is reproduced by picking out I-picture only. JP-A-2005-197839 discloses a method for executing special reproduction of a transport stream by storing and reading position information of an I-picture on and from a recording medium such as an HDD.

The related art described above refers to a method that, for executing special reproduction of an MPEG motion picture, position information of an I-picture is stored in a recording medium in advance and is then utilized.

However, in the above-stated related art, it is necessary to have data searched in advance to execute the special reproduction. In addition, the recording medium requires an area for storing position information of an I-picture.

Further, in TV program data that was recorded by another apparatus on a detachable recording medium such as a portable HDD, there is a possibility that I-picture information is not recorded. However, in the above-stated related art, special reproduction of such TV program data that does not contain position information of I-picture had not been taken into consideration.

SUMMARY OF THE INVENTION

Therefore, a video recording and reproducing apparatus that is capable of executing special reproduction of motion picture data that is recorded in the MPEG format even when position information of I-picture is not contained will be provided.

More specifically, TV program data that is recorded on a recording medium such as an HDD is read only for a prescribed amount, the data is output and searched in sequence to output data that makes up an I-picture, and subsequent data is discarded. Then, data on the next-specified position is read for the prescribed amount, and the data that makes up an I-picture is output. Data output for special reproduction will be conducted by repeating the above-stated steps.

With such arrangement, reproduction of picture by using an I-picture becomes possible, even if the picture does not contain information on reproduction position of I-picture at the time of special reproduction.

According to the measures stated above, it is possible to execute special reproduction of motion picture data that is recorded by using an MPEG format even if position information of I-picture is not contained.

BRIEF DESCRIPTION OF DRAWINGS

FIG. 3 is a diagram describing a configuration example where a timestamp is added to the packet shown in FIG. 2.

FIG. 4 is a schematic diagram describing an example of I-picture extraction processes of the video recording and reproducing apparatus according to the first embodiment for a transport stream recorded.

FIG. 6 is a schematic diagram describing an example of I-picture extraction processes of the video recording and reproducing apparatus according to the second embodiment for a transport stream recorded (No. 1).

FIG. 7 is a schematic diagram describing an example of I-picture extraction processes of the video recording and reproducing apparatus according to the second embodiment for a transport stream recorded (No. 2).

DESCRIPTION OF THE PREFERRED EMBODIMENTS

Hereinafter, the preferred embodiments according to the present invention will be described with reference to FIGS. 1 through 7.

First Embodiment

Hereinafter, the first embodiment will be described with reference to FIGS. 1 through 4.

First, by using FIG. 1, a configuration of a video recording and reproducing apparatus according to the first embodiment will be described.

Figure 1:
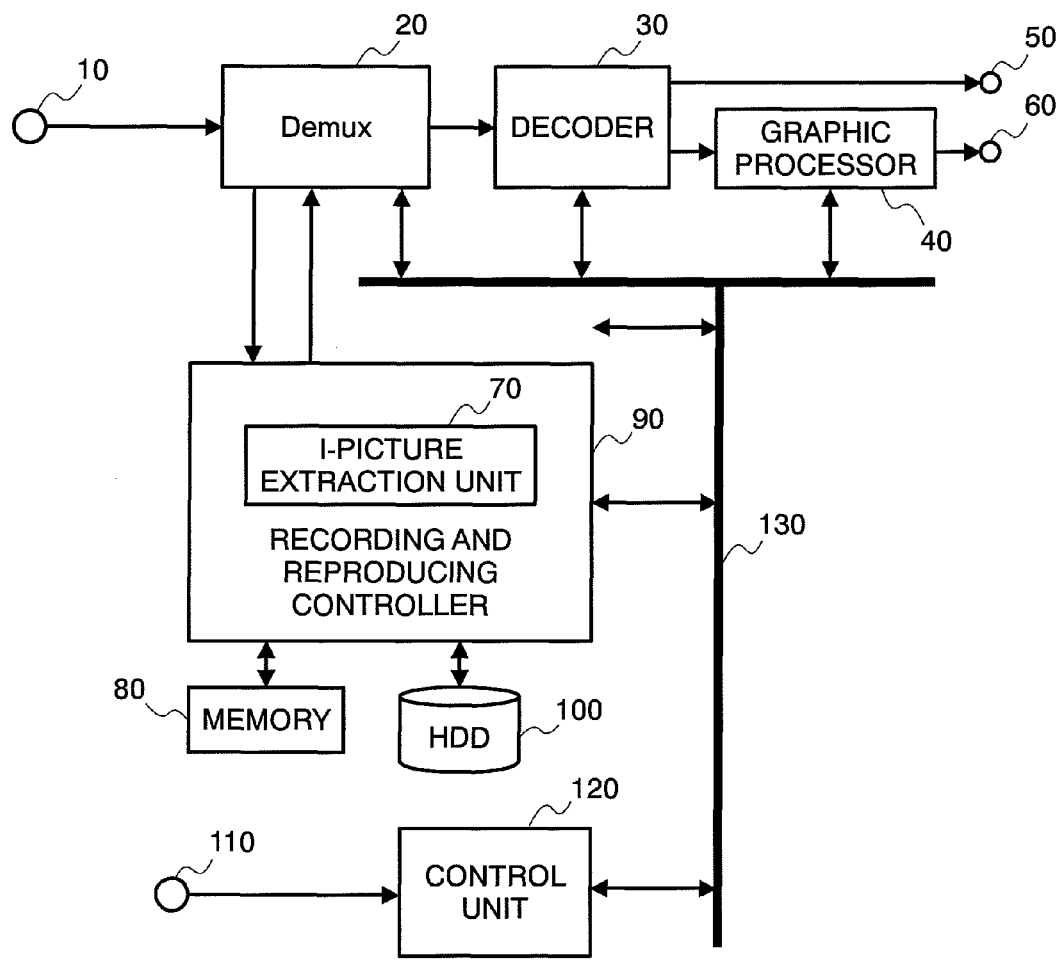
FIG. 1 is a block diagram illustrating a configuration example of a video recording and reproducing apparatus according to the first embodiment.

FIG. 1 is a block diagram illustrating a configuration example of a video recording and reproducing apparatus according to the first embodiment.

For the video recording and reproducing apparatus according to the embodiment, a video recording and reproducing apparatus which executes viewing, recording and reproducing by receiving digital broadcasting. Further, for an example of picture compression technologies, the case where a signal that is encoded and multiplexed under the Moving Picture Experts Group (MPEG) standard will be described.

A transport stream is input from an input terminal 10 that is shown in FIG. 1. Although not shown in FIG. 1, for digital broadcasting, a transport stream is reproduced by receiving, with a receiving antenna, radio waves transmitted from a broadcasting station, tuning the desired signal with a tuner, and performing demodulation, error correction, etc. It is to be noted that the structure of the transport stream will be described in detail later.

The transport stream is input to a demultiplexer 20. The demultiplexer 20 extracts encoded picture data, encoded voice data and various types of data from the transport stream thus input.

Here, for viewing the received broadcasting in real time, the encoded picture data and the encoded voice data that are extracted by the demultiplexer 20 are supplied to a decoder 30. A picture signal that is decoded by the decoder 30 is supplied to a graphic processor 40 and is then output with a graphic screen superimposed according to situation. Further, the encoded voice data is decoded to be output as a voice signal. The output picture signal of the graphic processor 40 and the output voice signal of the decoder 30 are output from a picture output terminal 50 and a voice output terminal 60 and are then reproduced by a reproduction apparatus (not shown in the diagram). These processes are controlled by a command from a remote control unit, etc. that are not shown in the diagram and input via an input terminal 110, and a control unit 120 that is operated by a control program stored in a memory (not shown in the diagram).

On the other hand, the instruction from a remote control unit, etc. is input to the control unit 120 from the input terminal 110. If a TV program that is specified by the instruction is to be recorded on an HDD 100, only a picture packet, a voice packet, a time information packet PCR (Program Clock Reference) and a packet related to the specified TV program by the demultiplexer 20 are extracted. Then, the packets are multiplexed for output with a packet that is newly created for a reference purpose during reproduction from the HDD 100 or a packet that is prepared in advance.

A recording and reproducing controller 90 adds timestamp data, which shows input time, to the transport stream inputted. The reason for adding timestamp data is to accurately reproduce timing of inputting the transport stream when the recorded data is reproduced from the HDD 100 and is output as a transport stream. With such arrangement, it is possible, with timing of inputting the transport stream, to output the time information packet PCR that is to be referred to when a transport stream that is recorded as data is reproduced and output for decoding by the decoder 40. The information on timestamp data is also used when extracting an I-picture which will be described later. Data structure of a packet to which timestamp data is added will also be described later. Further, processes that are required for recording such as encryption for protection of other copyrights are executed and the transport stream thus inputted is recorded on the HDD 100 as a TV program.

It is to be noted that memory 80 is storage means for temporarily holding data read out of the HDD 100 or storing control information.

For reproducing and viewing a recorded TV program, TV program data that is recorded on the HDD 100 is read by the recording and reproducing controller 90 as controlled by the controller 120, and, after applying processes such as deciphering, the TV program data is output as a transport stream.

Next, special reproduction methods such as fast forwarding will be described. For executing special reproduction, a packet of transport stream where an I-picture is stored in a payload is extracted by an I-picture extraction unit 70 (hereinafter, simply referred as "I-picture extraction"). The I-picture extraction processes will be described in detail later.

Then, a packet where an I-picture is stored in a payload is input to the demultiplexer 20 for extracting picture data. The data thus extracted is input to the decoder 30. The decoder 30 decodes the I-picture data thus input and outputs a picture of the I-picture.

Next, the structure of a transport stream which is handled by a video recording and reproducing apparatus according to the first embodiment will be described with reference to FIGS. 2 and 3.

Figure 2:
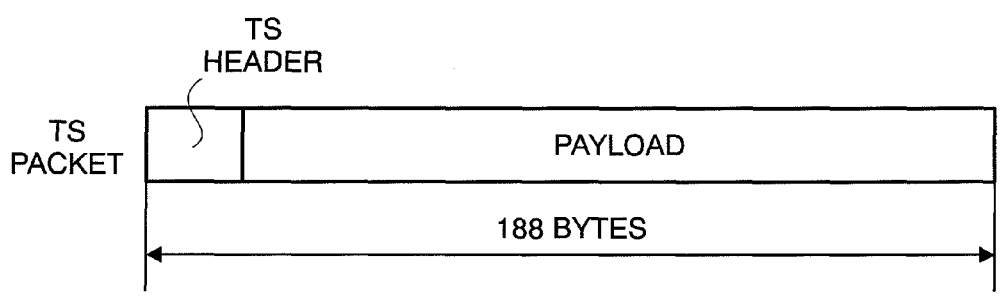
FIG. 2 is a diagram describing a configuration example of a packet that makes up a transport stream.

FIG. 2 is a diagram describing a configuration example of a packet that makes up a transport stream.

FIG. 3 is a diagram describing a configuration example where a timestamp is added to the packet shown in FIG. 2.

The transport stream which is handled by a video recording and reproducing apparatus according to the embodiment is constructed, for example, in a manner that a plurality of 188-byte TS packets that include a TS header and a payload are lined up as shown in FIG. 2.

In the recording and reproducing controller 90, as shown in FIG. 3, timestamp data that indicates input time is added to the packet shown in FIG. 2.

Next, I-picture extraction processes of the video recording and reproducing apparatus according to the embodiment will be described with reference to FIGS. 4 and 5.

FIG. 4 is a schematic diagram describing an example of I-picture extraction processes of the video recording and reproducing apparatus according to the first embodiment for a transport stream recorded.

Figure 5:
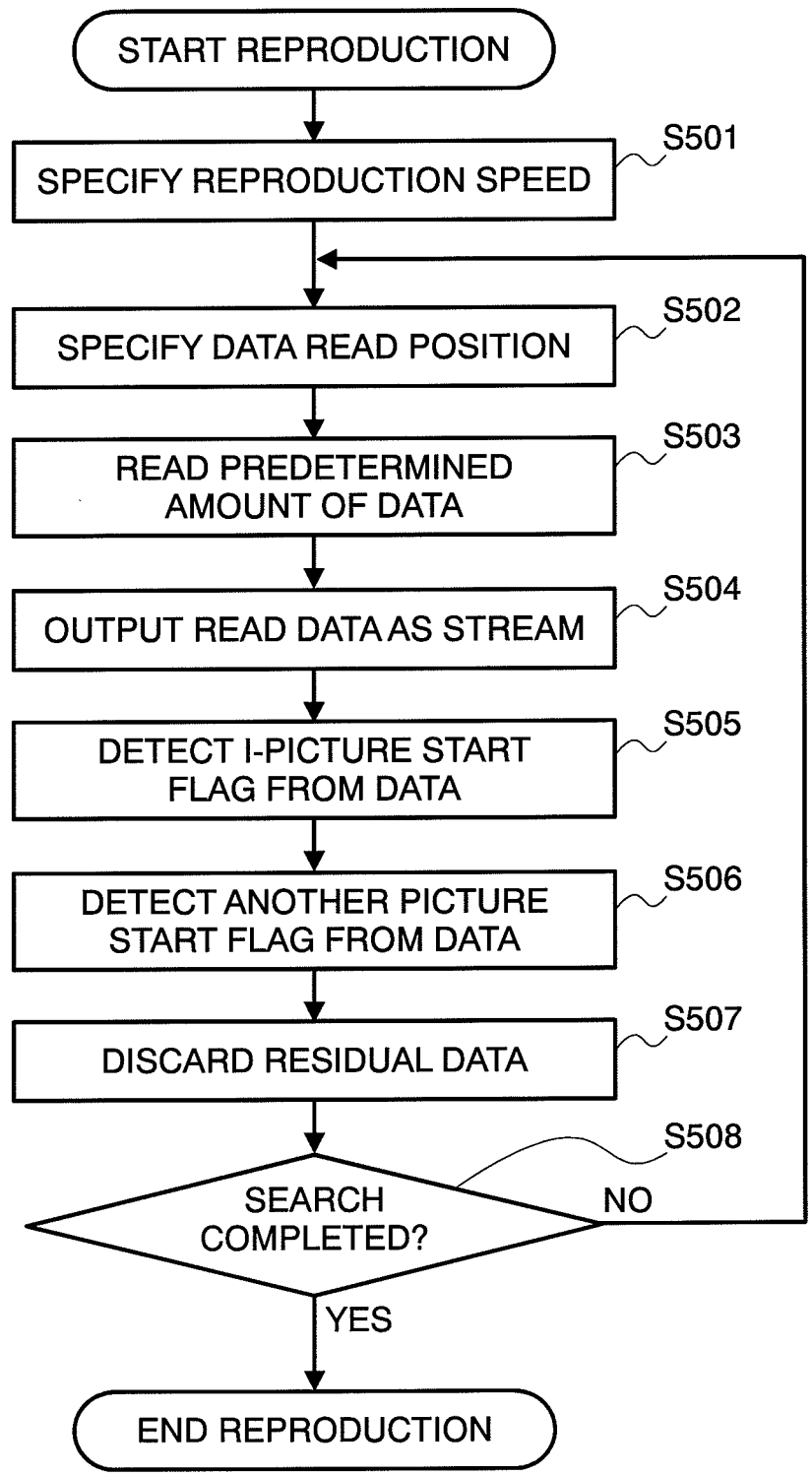
FIG. 5 is a flow chart illustrating an example of I-picture extraction processes of the video recording and reproducing apparatus according to the first embodiment.

FIG. 5 is a flow chart illustrating an example of I-picture extraction processes of the video recording and reproducing apparatus according to the first embodiment.

In the following example, the case where, as a special reproduction method, a user selects fast-forwarding reproduction will be described.

First, by using measures such as a remote control apparatus, for a TV program to be viewed by the user, a reproduction speed is specified and fast-forwarding reproduction is instructed (S501). For example, it shall be assumed that the user instructs a 10× fast-forwarding reproduction operation.

The controller 120, upon receiving the instruction, issues a command for reading data of an appropriate program which is stored in the HDD 100 to the recording and reproducing controller 90. The recording and reproducing controller 90 designates a data reading position (S502) and reads the predetermined amount of data (S503). For the predetermined amount of data, it is assumed, in FIG. 4, that 3 MB of data should be read. Here, the "predetermined amount of data" implies the amount of data that is arranged so that at least one I-picture can be contained.

Then, the data to be output from the recording and reproducing controller 90 is input to the I-picture extraction unit 70 as a transport stream.

The I-picture extraction unit 70 outputs the data thus input to the demultiplexer 20 as a transport stream (S504).

The I-picture extraction unit 70 detects a start flag of I-picture from the payload of the packet shown in FIG. 2 (S505). Further, upon detecting a start flag of another picture from a transport stream to be input subsequently (S506), the I-picture extraction unit 70 discards residual data (S507).

Processes from S502 to S507 are repeated until ending of search is instructed or up to the last data of the TV program (S508).

Referring to the example in FIG. 4, for the first reading, packets up to the packet where the I-picture data 100 is contained in the payload are output to the demultiplexer 20 as an output stream, and for the second reading, packets up to the packet where the I-picture data 200 is contained in the payload are output to the demultiplexer 20.

Here, to determine a position at which data is read from the HDD 100, it is necessary to know elapsed time per data unit. To know elapsed time per data unit during reproduction, calculation can be made based on the timestamp added to a packet, for example.

More specifically, for the case that time difference between the timestamp added to the head packet and the timestamp added to the end-most packet of the first-read data is 1 second, 10× fast-forwarding reproduction is specified, and it is necessary then to display a ten-second-later I-picture, data that exists 30 MB ahead may simply be read.

Further, to obtain a position at which data is read from an HDD, it may also be arranged that time information is added for a certain unit of data (for each 1.5 M bytes, for example), and reference is made to the information.

The demultiplexer 20 extracts picture data from the stream inputted and output the data to the decoder 30. The decoder 30 decodes the picture data and outputs a picture signal of the decoded I-picture to a display apparatus or the like.

Furthermore, since such processes enables to know the packet position of I-picture on a stream by using the I-picture extraction unit 70, it is also possible to add the packet position data as I-picture information to the content information thus read before storing the information on the HDD 100. Alternatively, it may also be arranged that storage means that is different from the HDD 100 is provided to store the information on the storage means. With such arrangement, load on processing system can be reduced since reproduction processing becomes possible thereafter based on the I-picture information.

With the embodiment, explanation is made by exemplifying a transport stream which is recorded on a recording medium such as an HDD after receiving digital broadcasting. However, the embodiment can be used, as another mode of usage, for reproduction of content that is downloaded from an external network such as the Internet.

Second Embodiment

Hereinafter, a second embodiment will be described with reference to FIGS. 6 through 8.

FIGS. 6 and 7 are schematic diagrams describing an example of I-picture extraction processes of the video recording and reproducing apparatus according to the second preferred embodiment for a transport stream recorded.

Figure 8:
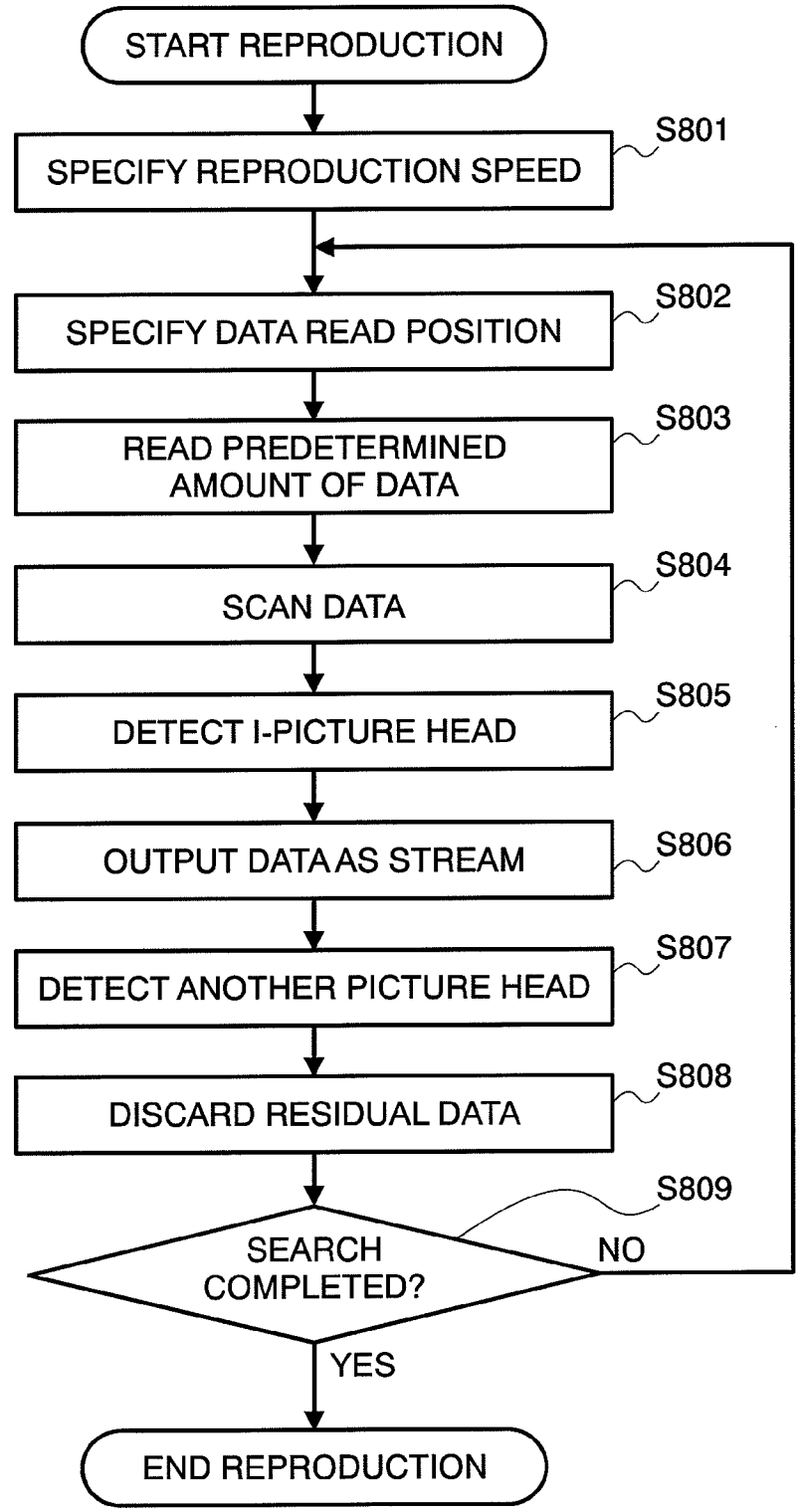
FIG. 8 is a flow chart illustrating an example of I-picture extraction processes of the video recording and reproducing apparatus according to the second embodiment.

FIG. 8 is a flow chart illustrating an example of I-picture extraction processes of the video recording and reproducing apparatus according to the second embodiment.

With the first embodiment, it was arranged that data that is read is first output as a stream, I-pictures are searched, and then the residual data is discarded (S504 to S507 in FIG. 5). Accordingly, with the first embodiment, unnecessary packets are contained in the leading parts of I-pictures as shown in FIG. 4.

The second embodiment is arranged that processing procedures of the I-pictures are modified so that such unnecessary packets will not be output.

It is to be noted that the hardware configuration shown in FIG. 1 and the data structure shown in FIG. 2 and FIG. 3 of the first embodiment remain same as the second embodiment.

In the following example, as is the case with the first embodiment, the case that fast-forwarding reproduction is chosen by a user as special reproduction will be described.

First, by using means such as a remote controller, a reproduction speed is specified and fast-forwarding reproduction is instructed for a TV program to be viewed by a user (S801). Here, again, it shall be assumed that the user instructs a 10× fast-forwarding reproduction operation.

The controller 120, upon receiving the instruction, issues a command for reading data of an appropriate TV program that is stored in the HDD 100 to the recording and reproducing controller 90. The recording and reproducing controller 90 specifies a data read position (S802) and read predetermined amount of data (S803). For the predetermined amount of data, it shall be assumed that data of 3 MB is read in FIG. 6 and FIG. 7, for example. Here, the "predetermined amount of data" implies data amount that is set so that at least one I-picture can be contained.

Then, the data to be output from the recording and reproducing controller 90 is input to the I-picture extraction unit 70 as a stream.

The I-picture extraction unit 70 scans the data thus input (S804), and detects the start flag of I-picture among the payload of the packet shown in FIG. 2 of the stream received. Upon detecting a start flag of I-picture, the I-picture extraction unit 70 outputs residual data as a stream to the demultiplexer 20 (S806). Then, upon detecting a start flag of another picture (S807), the I-picture extraction unit 70 discards residual data (S808).

It is to be noted that, in S804, the data read from the HDD 100 shall be temporally stored in memory such as working memory on an SDRAM or an LSI for processing.

With the embodiment, since it is arranged that data is output after detecting the I-picture head in S805, any extra packets will not be output.

Referring to the example shown in FIG. 6, for the first reading, packets that contain the I-picture data 100 in the payload are output to the demultiplexer 20 as an output stream, and for the second reading, packets that contain the I-picture data 200 in the payload are output to the demultiplexer 20 as an output stream. As it is understood from FIG. 6, the stream to be output is configured only with packets that contain I-pictures.

The examples described in the above were arranged to output data of an I-picture from data that is read at a time.

However, as another variation, it may be arranged, as shown in FIG. 7, that data of a plurality of I-pictures can be output from data that is read at a time.

In this case, processing to output data for detection of I-picture in S805 up to detection of I-picture head in S807 is conducted for the entire data read at a time.

With such arrangement, as shown in the example in FIG. 7, for the first reading, packets up to the packet where the I-picture data 100, 101 and 102 are contained in the payload are output to the demultiplexer 20 as an output stream, and for the second reading, packets up to the packet where the I-picture data 200 and 202 are contained in the payload are output to the demultiplexer 20. Also in this case, the stream to be output is configured only with packets that contain I-pictures, as is the case with FIG. 6.

In this example, when compared to the example shown in FIG. 6, since a plurality of I-pictures are contained in the stream to be output, it is expected that a user, when the user views the reproduced picture, can view a picture that moves more smoothly.

What is claimed is:

1. A video recording and reproducing apparatus comprising:
    a recorded data storage unit that stores recorded data containing at least motion picture data;
    a recording and reproducing controller which reads and outputs recorded data from the recorded data storage unit; and
    a controller which controls the recording and reproducing controller, wherein
    when executing special reproduction of the recorded data stored in the recorded data storage unit, which contains no position information of I-picture, the recording and reproducing controller reads and sequentially outputs a predetermined amount of recorded data stored in the recorded data storage unit at a position specified by the controller and detects I-picture start information and end information of MPEG-formatted motion picture data from the output data, and, upon detecting both of the I-picture start information and the end information at a time, discards residual data, and wherein
    the predetermined amount of recorded data read by the recording and reproducing controller is sufficient for storing at least one I-picture, and is a part of the recorded data stored in the recorded data storage unit.

2. The video recording and reproducing apparatus according to claim 1, wherein
    the controller records I-picture information that is acquired when detecting the I-picture in the recorded data storage unit by controlling the recording controller.

3. The video recording and reproducing apparatus according to claim 1, wherein
    the picture recording and reproducing apparatus further includes an information storage unit, and
    the recording and reproducing controller stores, in the information storage unit, I-picture information that is acquired when detecting the I-picture.

4. The video recording and reproducing apparatus according to claim 1, wherein
    the recording and reproducing controller outputs data that contains one of the I-pictures from the predetermined amount of recorded data that is read from the recorded data storage unit.

5. A method of reproducing video in a video recording and reproducing apparatus which includes a recorded data storage unit that stores recorded data containing at least motion picture data, a recording and reproducing controller which reads recorded data from the recorded data storage unit, and a controller which controls the recording and reproducing controller,
    when executing special reproduction of the recorded data stored in the recorded data storage, which contains no position information of I-picture,
    the method comprising the steps of:
    reading, by the recording and reproducing controller, a predetermined amount of recorded data from the recorded data storage unit;
    detecting, by the recording and reproducing controller, I-picture start information and end information in MPEG-formatted motion picture data from the predetermined amount of recorded data; and
    discarding, by the recording and reproducing controller, residual data upon detecting both of the I-picture start information and the end information at a time, and wherein
    the predetermined amount of recorded data read by the recording and reproducing controller is sufficient for storing at least one I-picture, and is a part of the recorded data stored in the recorded data storage unit.

6. The method of reproducing video in the video recording and reproducing apparatus according to claim 5, wherein
    the controller determines a position for reading predetermined amount of recorded data from the recorded data storage unit based on time information that is contained in the recorded data.

* * * * *